United States Patent [19]

Frick

[11] Patent Number: 5,018,385

[45] Date of Patent: May 28, 1991

[54] I.C. ENGINE AIRFLOW METER HAVING SPEED-BASED AUTOMATIC GAIN CONTROL

[75] Inventor: Michael J. Frick, Toano, Va.

[73] Assignee: Siemens Automotive L.P., Auburn Hills, Mich.

[21] Appl. No.: 499,130

[22] Filed: Mar. 26, 1990

[51] Int. Cl.⁵ ............................................. G01M 15/00
[52] U.S. Cl. ..................................................... 73/118.2
[58] Field of Search ............. 73/118.2, 204.19, 204.15, 73/204.16

[56] References Cited

U.S. PATENT DOCUMENTS 4,907,446  3/1990  Inada et al. ...................... 73/118.2

*Primary Examiner*—Robert Raevis
*Attorney, Agent, or Firm*—George L. Boller; Russel C. Wells

[57] ABSTRACT

The gain of the airflow meter electrical circuit is modified as a function of engine speed such that at any given throttle opening the gain over one portion of the engine speed range is different from what it is over another portion of the engine speed range. In the disclosed embodiment gain is greater over a lower portion of the speed range than it is over a higher portion of the speed range so that the airflow meter is endowed with increased resolution at low engine speeds where such increased resolution is beneficial. The invention is especially well suited for a hot-wire anemometer type airflow meter.

13 Claims, 5 Drawing Sheets

I.C. ENGINE AIRFLOW METER HAVING SPEED-BASED AUTOMATIC GAIN CONTROL

FIELD OF THE INVENTION

This invention relates to an airflow meter of an internal combustion engine.

BACKGROUND AND SUMMARY OF THE INVENTION

The airflow meter of an internal combustion (IC) engine measures the combustion airflow into the engine and delivers a corresponding electrical signal to the engine management electronic control unit (ECU). The ECU acts upon this signal to exercise control over certain engine functions, such as fuel delivery and spark timing for example, in accordance with schedules that have been programmed into the ECU.

For any given throttle setting, airflow into the engine may be considered essentially proportional to engine speed, and where the airflow meter is essentially a linear device, the measurement signal provided by the airflow meter is likewise essentially proportional to engine speed. Stated another way, the gain of such an airflow meter is essentially constant for any given throttle setting.

Where an airflow meter is required to have a range that encompasses all operating conditions of the engine, the output signal representing the smallest airflow will occur when the throttle is in idle position and the engine is operating at lowest speed, and the output signal representing the largest airflow will occur when the throttle is wide open and the engine is operating at maximum speed. In typical operation of most automotive vehicles, the concurrence of a high engine speed and of a throttle opening that is at or near wide open happens infrequently, and therefore it is only infrequently that the airflow meter is required to operate at the high end of its range. In other words, most of the time the airflow meter operates over only a limited portion of its range.

The present invention arises through the recognition of this phenomenon and provides an improvement for increasing the gain of the airflow meter at low engine speeds, where greater gain can be especially beneficial, but without altering the range that is required for high-speed, open-throttle operation. While one might be led to intuitively envision the simple addition of a suitable amplification stage to an existing airflow meter for increasing the gain, such an addition will not solve the problem of attaining increased resolution at lower speeds without also having an influence on the range. Moreover, such an addition would also amplify error and jitter, an undesirable side-effect.

In a comprehensive aspect, the present invention comprises means for changing the gain of the airflow meter as a function of engine speed, particularly means to modify the gain as a function of engine speed for any given throttle setting such that over one portion of the engine speed range for said given throttle setting, the gain is different from what it is over another portion of the engine speed range for the same throttle setting. The invention is especially well suited for a hot-wire anemometer type airflow meter.

In some of its more specific aspects the invention comprises: means to cause the gain to be greater for the low end of the engine speed range than it is for the high end; means to change the gain when the engine management ECU detects passage of engine speed through a certain speed; and means to modify the gain by modifying the effective resistance of an arm of a four-sided electrical bridge circuit of the airflow meter.

Other features of the invention, along with additional advantages and benefits, will become apparent upon reading the ensuing description and claims which are accompanied by drawings. The drawings present a currently preferred embodiment of the invention according to the best mode contemplated at this time for putting the invention into practice.

DESCRIPTION OF THE PREFERRED EMBODIMENT

Figure 1:
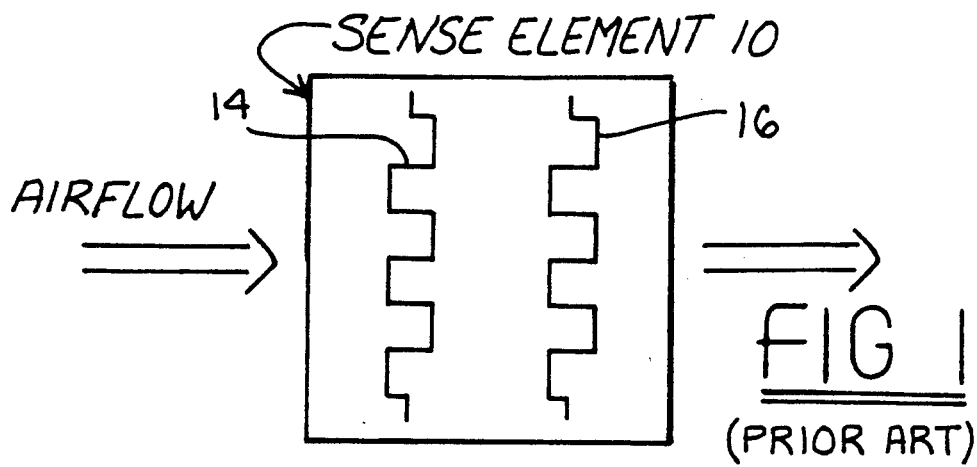
FIGS. 1, 2, and 3 relate to certain known airflow meters.
Figure 2:
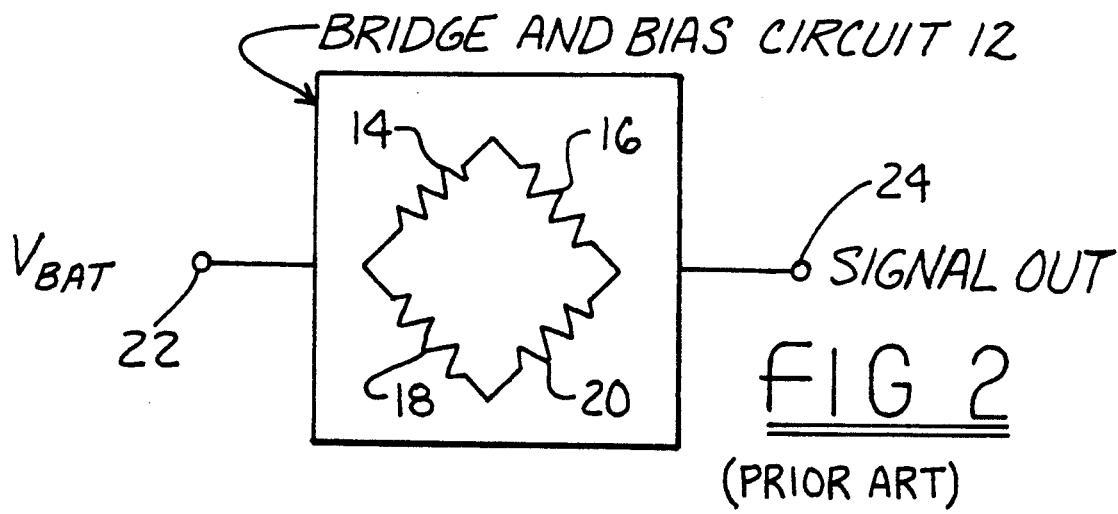
Figure 3:
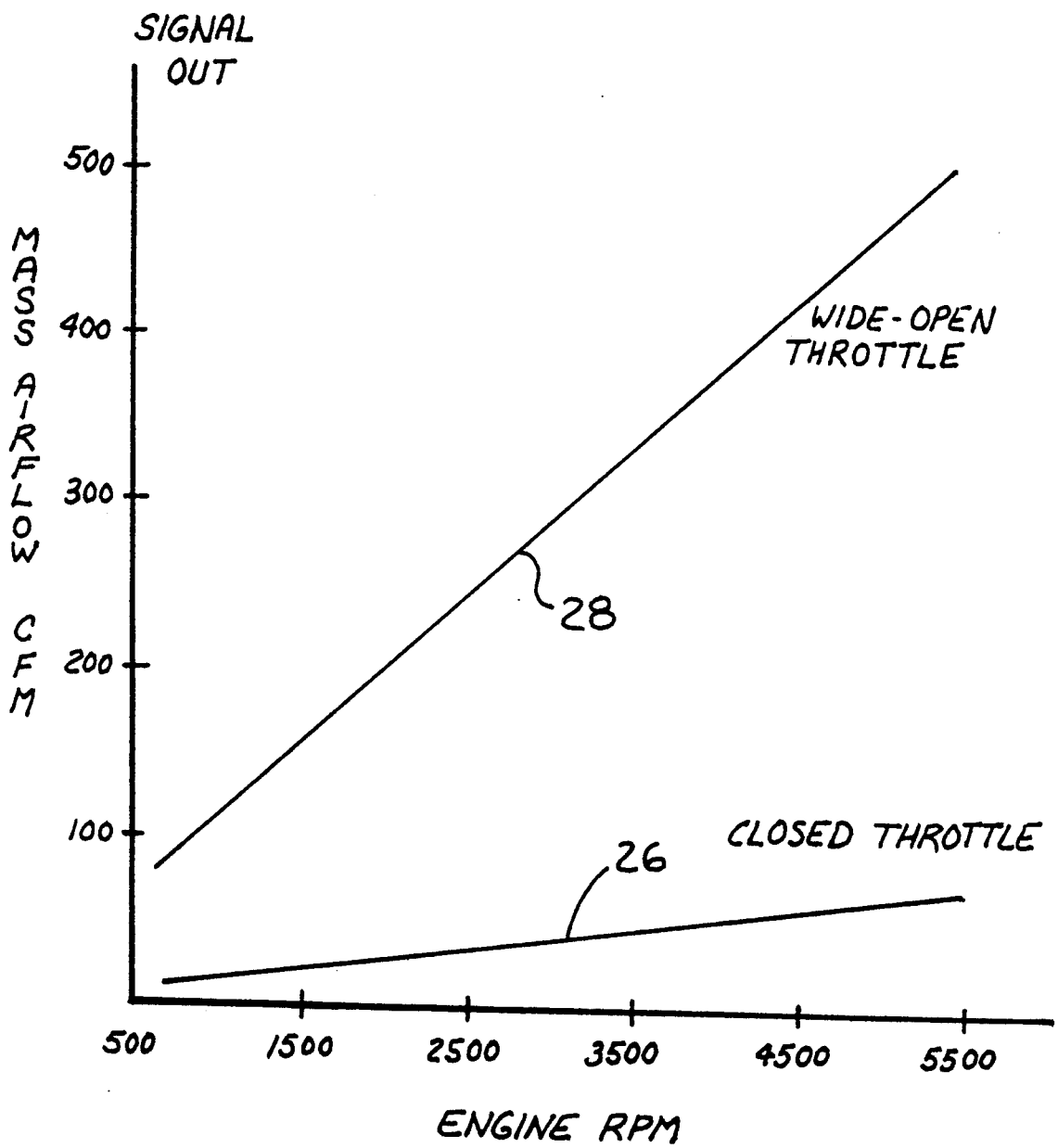

FIGS. 1, 2, and 3 generally describe certain known airflow meters. Such an airflow meter comprises a sense element 10 that is electrically connected in a bridge and bias circuit 12. The sense element comprises a first electrical circuit component 14 disposed to sense the flow of air through the airflow meter, and a second electrical circuit component 16 disposed to sense the ambient temperature of air. Component 14 is sometimes called the hot resistor, and component 16, the cold resistor. The two components 14, 16 are in respective first and third arms of the bridge and bias circuit 12. The other two bridge arms contain resistances 18, 20. D.C. current is delivered from the power supply to an input 22, and the signal delivered by sense element 10 appears at an output 24. This then is a general configuration for a hot-wire anemometer type airflow meter wherein the rate of heat rejection by the hot resistor to the airflow is made to correspond to the airflow rate so as to provide an airflow measurement signal, and the cold resistor provides temperature compensation.

The transfer function of the configuration of FIG. 2 is presented in the graph plots of FIG. 3. At closed throttle (engine idle), the rate of mass airflow indicated by the airflow meter (signal at output 24) as a function of engine speed is represented by the line 26. At wide open throttle, the rate of mass airflow indicated by the airflow meter as a function of engine speed is indicated by the line 28. At any throttle opening between closed throttle and wide open throttle, the rate of mass airflow indicated by the airflow meter as a function of engine speed would be indicated by a similar corresponding line lying between the illustrated lines 26, 28.

FIG. 3 reveals that at idle a unit change in engine speed will yield the same number of units change in indicated airflow at any engine speed; likewise at wide open throttle a unit change in engine speed will yield the same number of units change in indicated airflow at any engine speed; albeit that the number of units change in indicated airflow per unit change in engine speed is greater for wide open throttle than for idle. In other words, for a given throttle setting, the airflow meter has a substantially constant gain throughout the entire range of engine speeds, and as explained earlier, this means that the closer that the throttle setting is to idle position and the closer that the engine speed is to idle speed, the less of the airflow meter's signal range is used. Under such circumstances, significantly less than the full range of the airflow meter is utilized.

Figure 4:
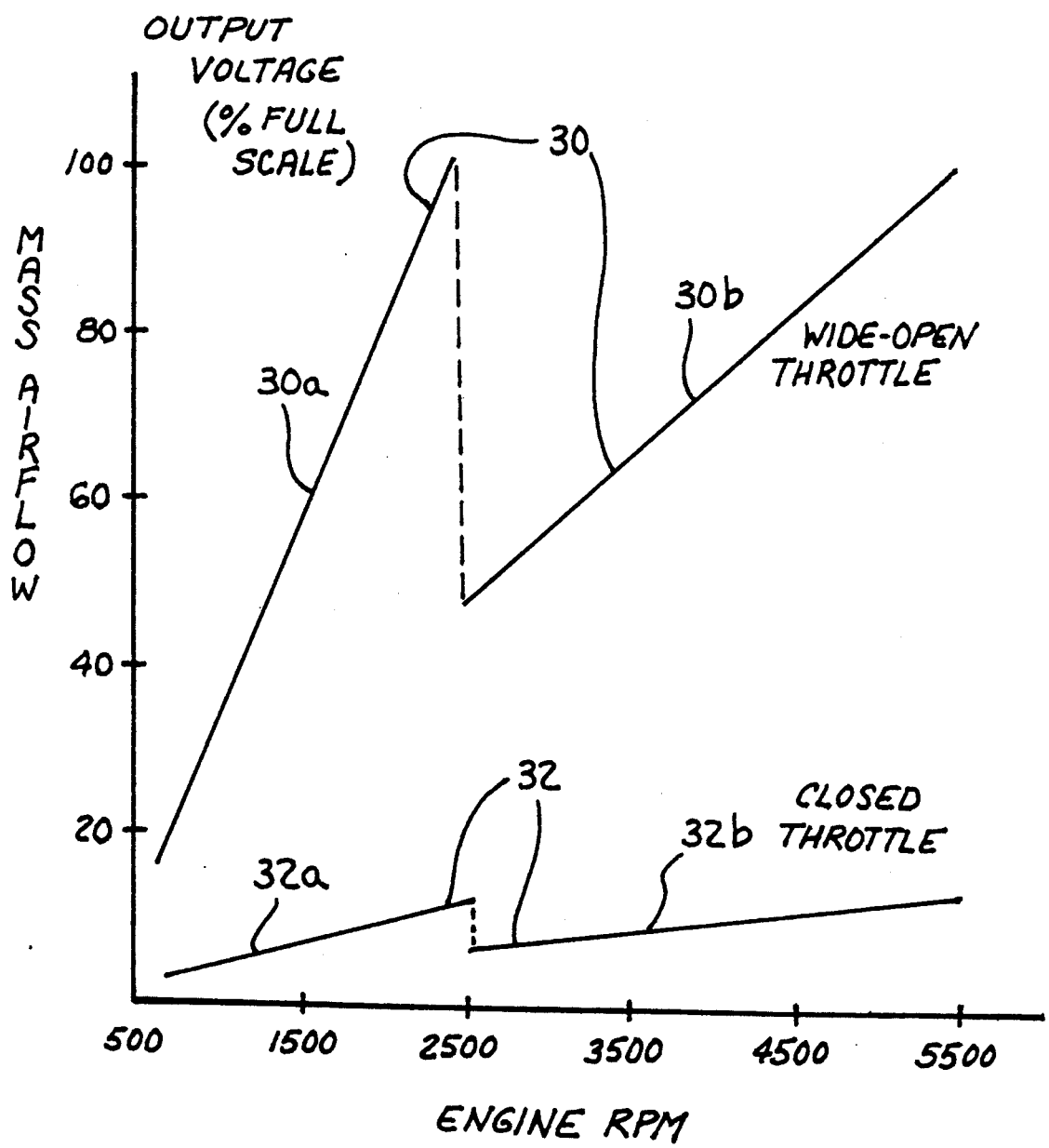
FIG. 4 is a graph plot useful in explaining the general inventive principles, and is to be contrasted with FIG. 3 which relates to certain known airflow meters.

In order to increase the resolution of the airflow meter at low speeds without affecting the range, the present invention has created an improvement that possesses a transfer function like that portrayed in FIG. 4. Rather than being essentially linear throughout as was the case in FIG. 3, the wide open throttle line 30 in the graph of FIG. 4 has a discontinuity at 2500 engine rpm so that it consists of a lower speed range segment 30a below 2500 engine rpm and an upper speed range segment 30b above 2500 engine rpm. In similar fashion the closed throttle line 32 in the graph of FIG. 4 also has a discontinuity at 2500 engine rpm dividing itself into a lower speed range segment 32a below 2500 engine rpm and an upper speed range segment 32b above 2500 engine rpm. One will further observe that the slope of segment 30a is greater than that of segment 30b and that the slope of segment 32a is greater than that of segment 32b. These features define a characteristic wherein the gain of the airflow meter is greater below 2500 engine rpm than it is above 2500 engine rpm. The same holds true for any other given throttle setting between wide open throttle and and closed throttle. Although the creation of discontinuities in the lines 30 and 32 results in potential ambiguities in the airflow meter reading, engine speed is monitored to avoid the occurrence of any such ambiguities. Exactly how this happens will be seen in the descriptions of FIGS. 5–7.

Figure 5:
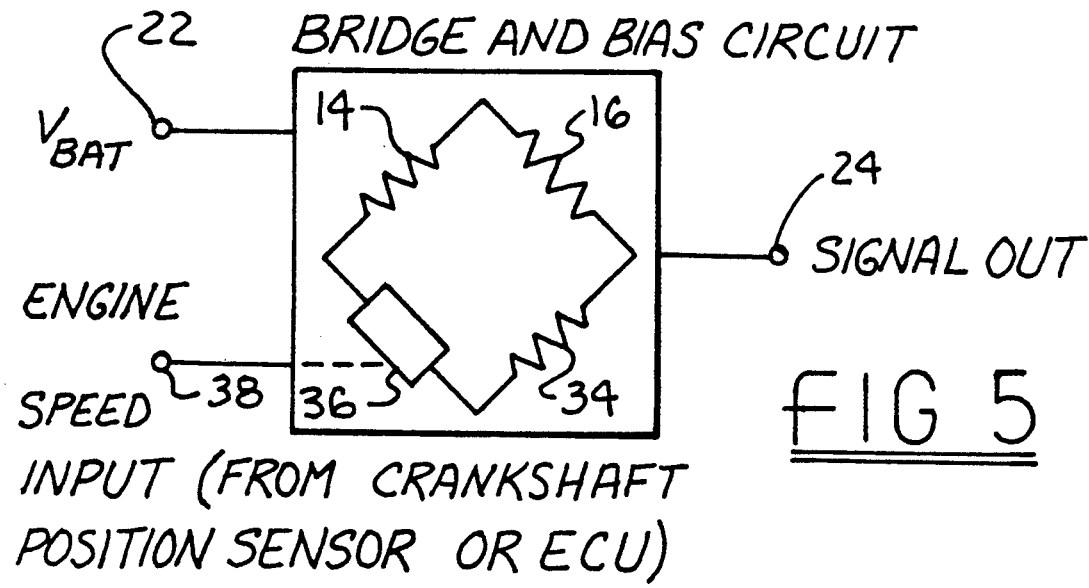
FIG. 5 is a general diagram of the inventive principles.
Figure 6:
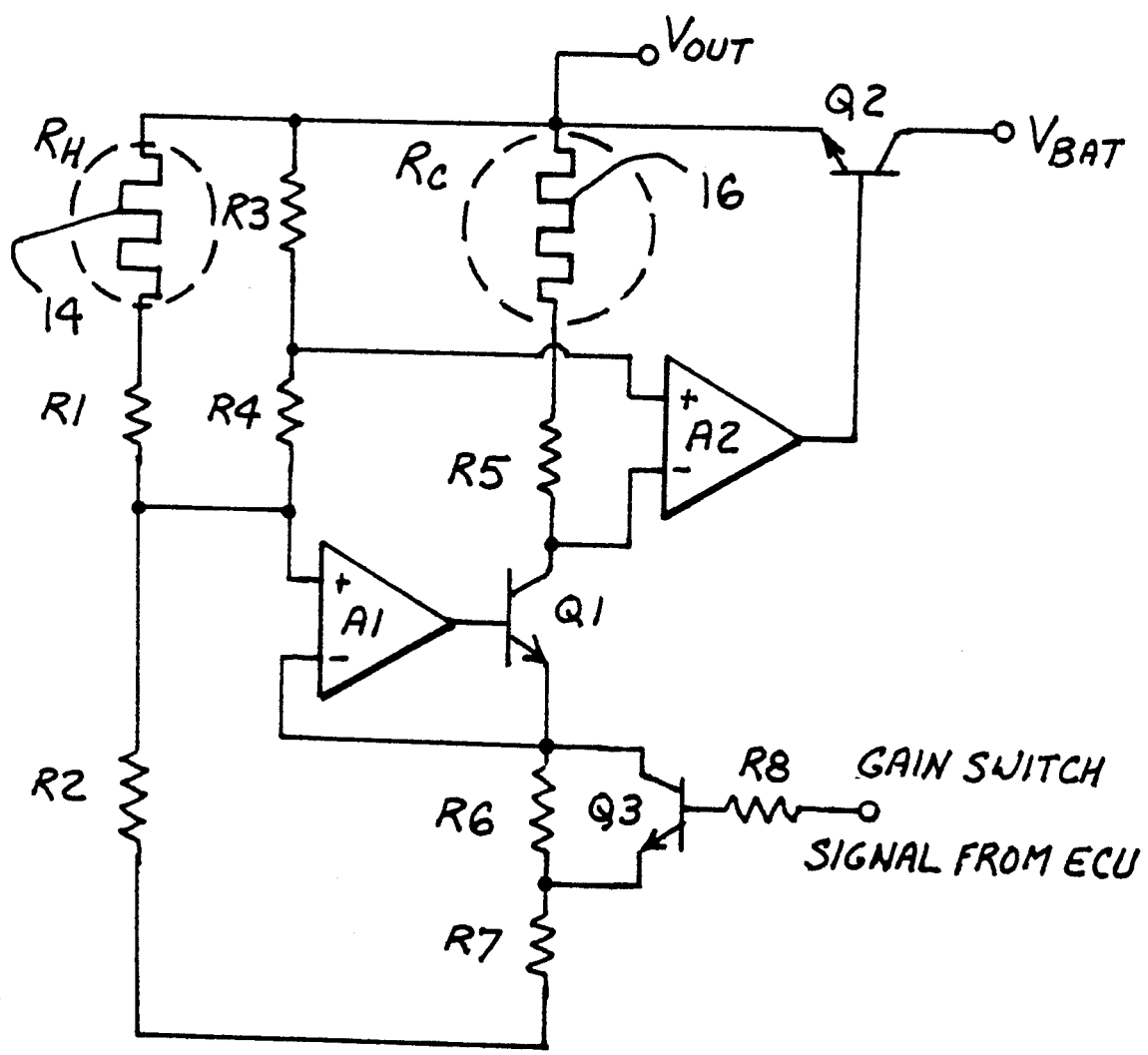
FIG. 6 is a detailed electrical schematic diagram of a first embodiment of the invention.
Figure 7:
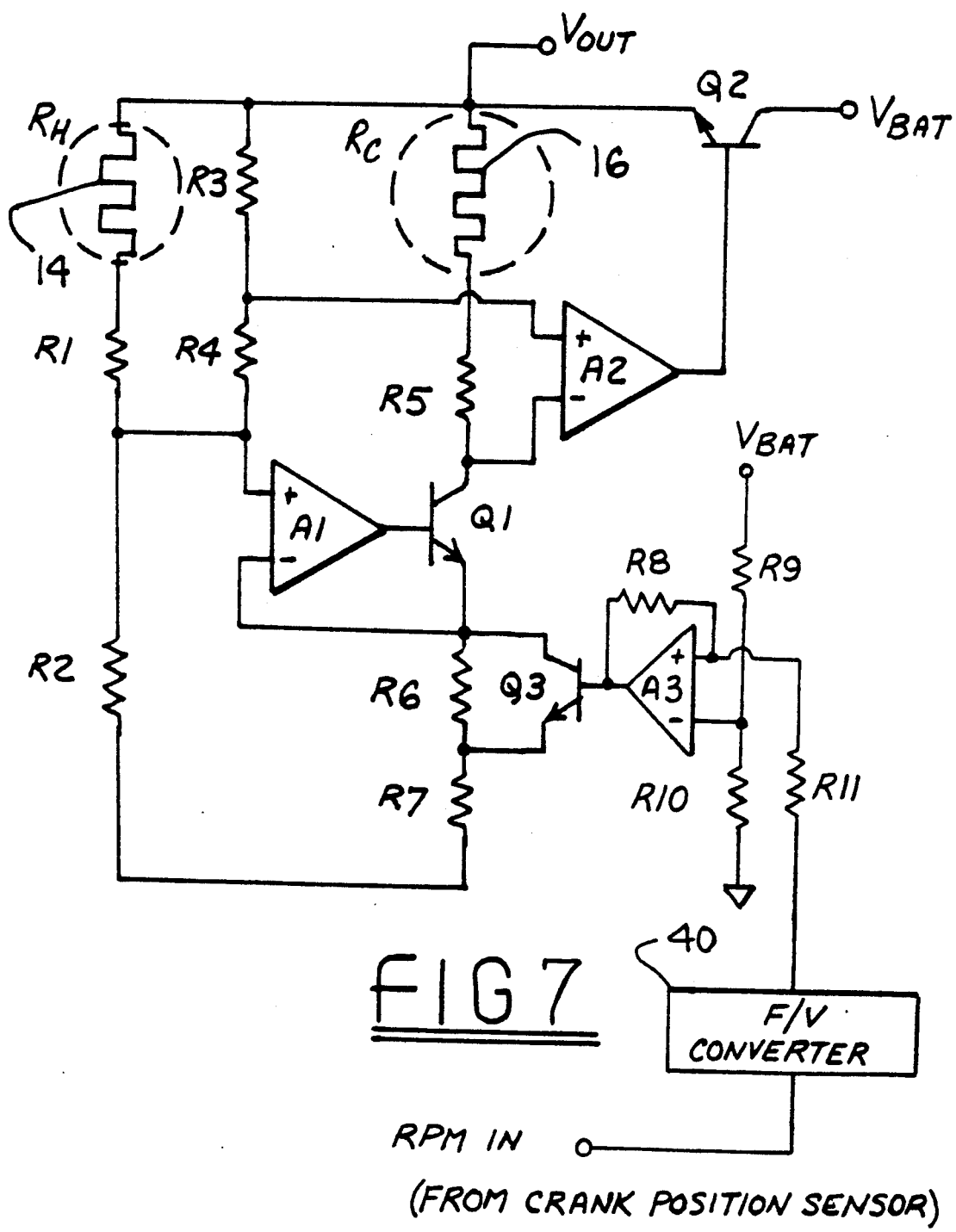
FIG. 7 is a detailed electrical schematic diagram of a second embodiment of the invention.

FIG. 5 shows general principles of the detailed schematics of FIGS. 6 and 7. Each circuit still utilizes a sense element having hot and cold resistors 14 and 16 arranged in two arms of a bridge. While one of the remaining two arms of the bridge contains a fixed resistance 34, the other remaining arm contains a variable resistance 36 whose effective value in the bridge is controlled by a signal delivered to another input 38. This signal is a function of engine speed, and is obtained from a crankshaft position sensor in the FIG. 6 embodiment and from an engine management ECU in the FIG. 7 embodiment.

In FIG. 6, components that have previously been described are identified by like reference numerals. Hot resistor 14 is placed in series with a fixed resistor R1 to form the first arm of the bridge. Cold resistor 16 is placed in series with a fixed resistor R5 to form the second arm of the bridge. The third arm of the bridge is formed by a fixed resistor R2 connected in series with the first arm. The fourth arm of the bridge is formed by the series combination of the collector-emitter circuit of an NPN transistor Q1, a fixed resistor R6, and a fixed resistor R7.

The circuit of FIG. 6 further comprises a voltage divider consisting of resistors R3 and R4 in parallel with the first arm of the bridge, a differential amplifier A1 having one input connected to the junction of the emitter of a transistor Q1 and of resistor R6, another input connected to the junction of the first and third arms of the bridge, and an output connected to the base of transistor Q1. There is also a second differential amplifier A2 having one input connected to the junction of resistors R3 and R4, another input connected to the junction of the second and fourth arms of the bridge, and an output connected to the base of an NPN transistor Q2 whose emitter-collector circuit carries the current to the bridge from a D.C. power supply $V_{bat}$. Still further, the emitter-collector circuit of an NPN transistor Q3 shunts resistor R6, and the transistor's base is connected through a resistor R8 to a particular output of the engine management ECU.

The operation of the circuit is as follows. Transistor Q3 is operated in switching mode so as to be either fully saturated or fully cut-off. When it is cut off, the resistance of the fourth arm of the bridge equals the sum of the resistances of resistors R6 and R7; when it is saturated, the resistance of the fourth arm of the bridge is essentially that of resistor R7 alone. In this way the signal from the ECU sets the bridge gain, and the particular engine speed that causes the ECU signal to switch defines the speed at which the discontinuities in the graph plots of FIG. 4 occur. When a discontinuity occurs, not only is there change in slope in the mathematical equations defining the two segments of each line, there is also a change in offset. The effect of such offset can be easily taken into account in the ECU's processing of the airflow meter circuit's output Vout which is delivered to the ECU. Since the ECU always knows the actual engine speed, it knows the particular speed range in which the airflow meter is operating, and since it also always knows current throttle position, it knows at all times the particular line segment, such as 30a, 30b, 32a, 32b for example, along which the airflow meter is operating and hence the slope (gain) and offset.

The current flow into both the hot resistor 14 and the cold resistor 16 is through the single transistor Q2. Whenever there is a change in the airflow rate through the airflow meter, the rate of $I^2R$ heat rejection by the hot resistor 14 begins to change. The airflow meter circuit detects this change, functions to maintain bridge balance, and consequently will make a corresponding change in the conductivity of transistor Q2 to compensate for the change in the rate of heat rejection by hot resistor 14. This ultimately causes a corresponding change in the voltage at the emitter of transistor Q2, and accordingly this emitter voltage is used as the airflow rate measurement signal to the ECU. Because a change in the emitter voltage of transistor Q2 also affects the current flow through the cold resistor 16, the bridge is kept in balance throughout the circuit's operating range by the action of differential amplifier A1 on transistor Q1.

Transistor Q1 controls the amount of current that is permitted to flow through the second and fourth arms of the bridge. A change in emitter voltage of transistor Q2 that occurs in response to a change in airflow rate tends to unbalance the bridge unless an appropriate adjustment is made in the current flow through the second and fourth arms of the bridge. Such adjustment is performed by the action of differential amplifier A1 in changing the conductivity of transistor Q1. The R3-R4 voltage divider across the first arm of the bridge detects the change in voltage which occurs across the first arm in response to a change in airflow rate. The differential input to differential amplifier A1 similarly changes causing an adjustment in the conductivity of transistor Q1 to adjust the current through the second and fourth arms of the bridge so as to maintain bridge balance, and in this way the balance is maintained over the operating range of the airflow meter.

In analogous manner, the circuit will operate to maintain balance when there is any change in current flow through the second and fourth arms due either to a change in ambient temperature as sensed by the cold resistor 16 or to switching of transistor Q3 from one state to the other.

Because the bridge is maintained in balance, the voltage at the junction of the second and fourth arms of the bridge, and hence the voltage seen by one input of differential amplifier A2, will remain essentially constant over the airflow meter's operating range. The voltage seen by the other input of differential amplifier A2 will however vary with the current flow through the first arm of the bridge by virtue of the connection to the junction of the resistors R3–R4. Therefore the conductivity adjustment of transistor Q2 by differential amplifier A2 responds to change in the heat dissipation by the hot resistor 14 due to change in airflow rate so that the emitter voltage of transistor Q2 will give an accurate signal of the airflow rate.

FIG. 7 is a second embodiment that is the same as that of FIG. 6 in all respects except for the manner in which the conductivity of transistor Q3 is controlled. In FIG. 7 the conductivity of transistor Q3 is controlled directly by engine speed, namely the "rpm in" signal which is typically derived as a pulse waveform from a crankshaft position sensor. The "rpm in" signal is processed by a frequency-to-voltage converter 40 to develop a voltage signal that is indicative of engine speed. This signal is compared by a differential amplifier A3 against a reference signal from an R9–R10 voltage divider, and the differential amplifier output controls the conductivity of transistor Q3. The arrangement may be such that the transistor is operated in its active region instead of in switching mode. Thus, the gain of the bridge is made a continuous function of engine speed, rather than merely a particular one of two discrete levels. Although not shown in the schematic of FIG. 7, it may be desirable to provide feedback to the ECU so that the ECU will always know the bridge gain is at any given time.

The principles of the invention having been disclosed by way of example in a presently preferred embodiment, what is claimed for the protective right is now set forth.

What is claimed as the invention is:

1. In an internal combustion engine having an airflow meter, including an electric circuit, delivering an electric signal measurement of induction airflow past a throttle into the engine, the improvement comprising means to modify the gain of said electric circuit as a function of engine speed such that at any given throttle opening the gain over one portion of the engine speed range is different from what it is over another portion of the engine speed range.

2. The improvement set forth in claim 1 in which said electric circuit comprises a first circuit component disposed to sense the rate of airflow and a second circuit component disposed to compensate for changes in air temperature.

3. The improvement set forth in claim 2 in which said one portion of the engine speed range is below a certain speed, said another portion of the engine speed range is above said certain speed, and the gain of said circuit is greater for said one portion of the engine speed range than it is for said another portion of the engine speed range.

4. The improvement set forth in claim 3 in which said engine includes an engine management ECU in which said certain speed is set and means providing for a signal from said engine management ECU to said electric circuit to change the gain of said electric circuit when said engine management ECU detects passage of engine speed through said certain speed.

5. The improvement set forth in claim 2 in which said electric circuit comprises a bridge containing said first circuit component in a first arm of the bridge and said second circuit component in a second arm of said bridge, and said means to modify the gain of said electric circuit comprises means to modify the effective resistance of an arm of said bridge.

6. The improvement set forth in claim 5 in which said means to modify the effective resistance of an arm of said bridge comprises a semi-conductor device in association with resistance in a third arm of the bridge.

7. The improvement set forth in claim 6 in which said semi-conductor device comprises a transistor.

8. The improvement set forth in claim 1 in which said electric circuit comprises a bridge containing plural circuit components, one of said circuit components being disposed for rejection of heat from itself to passing airflow and another of said circuit components being disposed for compensating the circuit for changes in the temperature of the airflow passing over said one circuit component, and said means to modify the gain of said electric circuit comprises a semi-conductor device associated with said bridge to set the effective resistance of an arm of said bridge as a function of engine speed.

9. The improvement set forth in claim 8 in which said semi-conductor device comprises a transistor.

10. The improvement set forth in claim 1 in which said electric circuit comprises a bridge containing a first resistor in a first arm disposed for rejecting heat from itself to passing airflow, a second resistor in a second arm disposed for sensing temperature to compensate for air temperature changes, a third resistor in a third arm, and a fourth resistor in a fourth arm, one active circuit device having a pair of inputs that are respectively connected to a junction between said first arm and said third arm and to a junction between said second arm and said fourth arm and an output that is connected to the input of a semi-conductor device whose output is connected in circuit relationship with said second arm, a voltage divider in parallel circuit relationship with said first resistor, another active circuit device having a pair of inputs that are respectively connected with said voltage divider circuit and with said semi-conductor device and an output that is coupled to the input of another semi-conductor device that controls the current flow into the bridge.

11. The improvement set forth in claim 10 in which said semi-conductor devices comprise respective transistors.

12. The improvement set forth in claim 10 in which said means to modify the gain of said electric circuit comprises yet another semi-conductor device connected with said fourth arm of the bridge.

13. The improvement set forth in claim 12 in which said yet another semi-conductor device comprises a transistor.

* * * * *